No. 871,973. PATENTED NOV. 26, 1907.
F. VEITH.
MULTIPART MOLD FOR PNEUMATIC TIRES.
APPLICATION FILED JAN. 26, 1907.
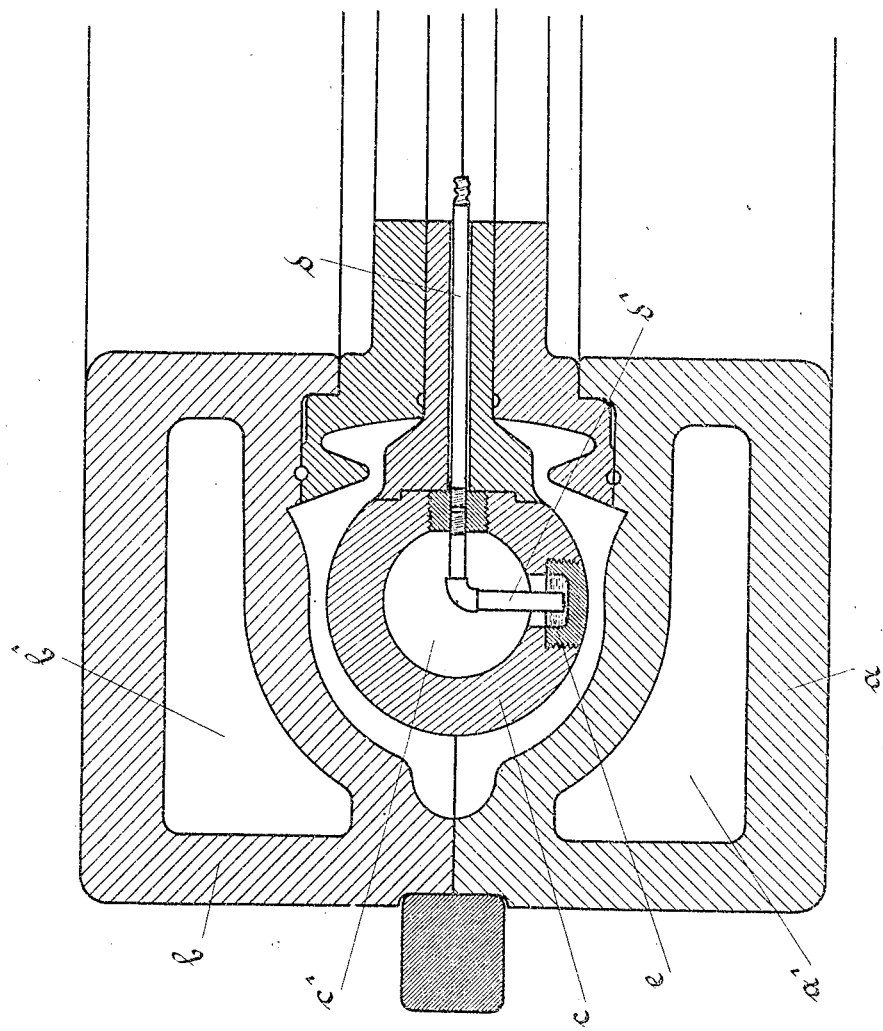

UNITED STATES PATENT OFFICE.

FRIEDRICH VEITH, OF VEITHWERK, NEAR HÖCHST, GERMANY.

MULTIPART MOLD FOR PNEUMATIC TIRES.

No. 871,973.  Specification of Letters Patent.  Patented Nov. 26, 1907.

Application filed January 28, 1907. Serial No. 354,413.

*To all whom it may concern:*

Be it known that I, FRIEDRICH VEITH, a subject of the Emperor of Germany, resident of Veithwerk, near Höchst, in the Grand Duchy of Hesse, Germany, have invented certain new and useful Improvements in Multipart Molds for Pneumatic Tires, of which the following is a specification.

My invention relates to molds for the covers of pneumatic tires and particularly to molds which are made hollow, so that steam may be introduced to heat them.

The object of my invention is to provide for a convenient means of removing from the hollow core employed in molds of the above indicated character water produced by the condensation of steam, and to do this by means of a pipe passing between the edges of the cover, so that such edges will not be affected by the drain pipe.

My invention will be fully described hereinafter, and the features of novelty pointed out in the appended claims.

Reference is to be had to the accompanying drawing, which is a vertical section of a mold constructed according to my invention.

*b* and *a* are the upper and lower portions respectively of the mold, provided with chambers *b'* and *a'* for the circulation of steam. *c* is the core, having a chamber *c'*. These parts may be constructed in any suitable manner, and the novel feature of my invention consists in the provision of a groove or gutter *e* at the bottom of the chamber *c'* into which groove dips the downwardly bent end of a drain pipe *d*, leading outwardly between the edges of the tire cover. The shape of this tire cover is indicated by the outline of the core and of the upper and lower mold portions. Steam is admitted to the chamber *c'* through a pipe located in the same manner as the pipe *d* to pass between the edges of the tire cover. Any water produced by the condensation of steam in the chamber *c'* will collect in the groove *e* and will be expelled through the pipe *d* by the pressure of the live steam. The downwardly bent inner end of the pipe *d* forms a hydraulic seal in the gutter *e*. With this arrangement I secure a permanently uniform heating of the core, and this is the object of my invention.

I claim:

1. A mold for pneumatic tire covers comprising a core having an internal chamber and a gutter or depression at the lower part of said chamber for the reception of condensation water, and a drain pipe leading from said depression.

2. A mold for pneumatic tire covers comprising a core having an internal chamber and a depression or gutter at the lower portion of said chamber for the reception of condensation water, and a drain pipe having its inner end dipping into such depression to form a hydraulic seal.

3. A mold for pneumatic tire covers, comprising upper and lower sections, a core located between them, said core being chambered and having a depression in which the condensation water may collect, and a drain pipe leading from said depression and extending between the upper and lower mold sections, so as not to affect the edges of the tire cover.

In testimony whereof, I have hereunto set my hand in the presence of two subscribing witnesses.

FRIEDRICH VEITH.

Witnesses:
 WALTER HAUSING
 WALTER SCHUMANN.